United States Patent [19]

Andrews, Jr. et al.

[11] Patent Number: 5,184,836
[45] Date of Patent: Feb. 9, 1993

[54] REFUSE CONTAINER HAVING STACKING AND NESTING HANDLES

[75] Inventors: Howard W. Andrews, Jr.; Paul E. Delmerico; Greg P. Terek, all of Winchester, Va.

[73] Assignee: Rubbermaid Commercial Products Inc., Winchester, Va.

[21] Appl. No.: 605,109

[22] Filed: Oct. 26, 1990

[51] Int. Cl.⁵ .......................................... B62B 11/00
[52] U.S. Cl. ................................. 280/79.5; 280/79.2; 280/47.34; 206/504; 206/519; 220/23.83; 220/908; 248/129; D34/1; D34/5
[58] Field of Search ................... 206/504, 515, 519; 220/23.4, 23.83, 298, 908, 909; 215/330, 331; 280/87.01, 87.021, 87.05, 33.998, 47.34, 79.11, 79.2, 79.5; D34/1, 5, 23; D9/425, 428, 430; 248/129, 131; 16/110.5

[56] References Cited

U.S. PATENT DOCUMENTS

| | | | |
|---|---|---|---|
| D. 233,127 | 10/1974 | Karn | D34/23 |
| D. 251,833 | 5/1979 | Maza et al. | D34/23 |
| D. 253,932 | 1/1980 | Mockler | D34/5 |
| D. 256,902 | 9/1980 | Maza et al. | D34/23 |
| D. 257,721 | 12/1980 | Maza et al. | D34/23 |
| D. 257,767 | 1/1981 | Maza et al. | D34/23 |
| D. 257,823 | 1/1981 | Maza et al. | D34/23 |
| D. 260,229 | 8/1981 | Maza et al. | D34/1 |
| D. 271,248 | 11/1983 | Maza et al. | D34/8 |
| D. 280,459 | 9/1985 | McClelland | D34/8 |
| D. 292,638 | 11/1987 | Carville | D34/5 |
| 926,288 | 6/1909 | Rice | 248/128 |
| 1,525,242 | 2/1925 | Jagschitz | 52/126.7 |
| 2,602,568 | 7/1952 | Kinney, Jr. | 206/519 |
| 2,689,469 | 9/1954 | Happe et al. | 220/69 |
| 3,269,580 | 8/1966 | Tolbert, Jr. | 220/23.4 X |
| 4,027,774 | 6/1974 | Cote | 220/908 X |
| 4,390,110 | 6/1983 | Pirro | 220/908 X |
| 4,664,347 | 5/1987 | Brown et al. | 206/519 X |
| 4,834,253 | 5/1989 | Crine | 220/23.4 |
| 4,971,215 | 11/1990 | Santoni | 206/519 X |
| 5,074,572 | 12/1991 | Delmerico et al. | 280/47.34 |

FOREIGN PATENT DOCUMENTS

| | | |
|---|---|---|
| 506025 | 9/1954 | Canada . |
| 675843 | 12/1963 | Canada ............... 206/519 |
| 2035539 | 1/1972 | Fed. Rep. of Germany ..... 220/23.4 |
| 2264595 | 5/1974 | Fed. Rep. of Germany . |
| 2902857 | 7/1980 | Fed. Rep. of Germany ...... 206/519 |
| 681259 | 1/1930 | France . |
| 154659 | 5/1956 | Sweden . |
| 509453 | 7/1939 | United Kingdom ............... 206/519 |
| 720135 | 12/1954 | United Kingdom ............... 206/519 |

OTHER PUBLICATIONS

Sell Sheet, White, 10770 N. 46th Street, P.O. Box 16647, Tampa, Florida 33687, publication date Jul. 1, 1988.
Catalog Page, Continental Manufacturing Co., 123 Byassee Drive, St. Louis, Mo. 63042, publication date unknown.
Sell Sheet, Continental Manufacturing Co., 123 Byassee Drive, St. Louis, Mo. 63042, publication date 1990.
Pp. 2, 6 and 10, Rubbermaid Commercial Products Inc., 3124 Valley Avenue, Winchester, Va. 22601, publication date 1988.
Pp. 25, 28 and 29, Rubbermaid Incorporated, 1147 Akron Road, Wooster, Ohio 44691, publication date 1990.
Sell Sheet, "Introducing the New Square Brute ® Container", copyright 1990.

*Primary Examiner*—Charles A. Marmor
*Assistant Examiner*—Brian L. Johnson
*Attorney, Agent, or Firm*—Richard B. O'Planick

[57] ABSTRACT

A quadrilateral refuse container (2) comprising a bottom (8) and four sidewalls (6) extending upwardly therefrom and terminating in an upper rim (64). The container further comprises a handle (52) extending outward from at least one side of the container, the handle having two parallel spaced apart sideplates (54), each sideplate having a lower edge profile for defining a downwardly concave recess (62). When one container is stacked inside a like-configured second container, the upper rim of the bottom container is nested within the handle sideplate recesses of the top container, and the sidewalls of the underlying container are held in a fixed vertical orientation. Recesses (49) are further provided within sidewalls (6) of the container, adapted to receive handle projections from a like configured second container, whereby the containers can be stored in a side by side abutment.

17 Claims, 8 Drawing Sheets

REFUSE CONTAINER HAVING STACKING AND NESTING HANDLES

FIELD OF THE INVENTION

The present invention relates to mobile refuse container assemblies in general, and in particular to containers having stacking and nesting handles.

BACKGROUND OF THE INVENTION

Mobile refuse container assemblies are well known in sanitary maintenance applications. Typically such assemblies comprise a refuse container, round in transverse cross section, and a circular dolly which is attachable to the underside of the container by screw thread engagement. For example, U.S. Design Pat. Nos. 256,902 and 257,721 illustrate the dolly of the type conventionally used in a industry. Additionally, U.S. Design Pat. No. 260,229 illustrates a round refuse container which is adapted for screw thread attachment to the dolly.

While the above identified dolly and container combination works well and has been generally well accepted in the trade, certain shortcomings prevent the assembly from representing an ideal solution to the industries' needs. First, round refuse containers are not as volume efficient as square or rectangular cross-sectional refuse containers. Stated differently, a circular refuse container must have a diameter which is greater than the side of a square footprinted refuse container in order to contain the same volume of waste material. This volumetric inefficiency means that a round container takes up greater storage space than a square or rectangular container. Also, a round container cannot be stored flat against a wall, making it less than suitable for situations where storage space is limited.

Additionally, refuse containers typically have two handles extending from opposite sides of the container outwardly. Placing such a container against a flat wall, or abutting one container against another, can be prohibited due to interference caused by the handles. Handle interference prevents compact storage of the container against another surface, making less than optimal use of storage space.

Adaptation of conventional circular refuse containers to a square configuration however is not straight forward, since the refuse container must be connectable to a dolly component in order to be mobile. Most conveniently, moreover, the waste container should be connectable to a dolly by screw thread attachment. In the prior art, a waste container is provided with a centrally disposed cylindrical socket extending into an underside surface, which receives a cylindrical boss centrally disposed in the top surface of the dolly. The container cylindrical socket is internally threaded to receive the externally threaded dolly boss. In a circular configuration, merely screwing the dolly component into the socket of the waste container results in a satisfactory combination. However, for a square or rectangular footprinted dolly and container, attaching the dolly to the container by rotationally screwing it into the socket can result in a misalignment between the dolly and the waste container side walls.

Moreover, as discussed above, the handles of square refuse containers can interfere with each other, and with vertical walls, making the storage of such containers cumbersome, resulting in a less than optimal utilization of space. A second problem, created by the stacking of one square configured refuse containers within another, is the resultant outward flexure of the sidewalls of the underlying container. When a number of square refuse containers are stacked into one another, such as for display or shipment, a substantial amount of weight is brought to bear on the bottommost container's sidewalls. The lowermost container sidewalls have a tendency to flex outward. Over time, this flexure results in an outward bias of the container sidewalls, whereby preventing the lid for the container from fitting. Since refuse containers are relatively bulky items, it is imperative that they be able to be stacked in order to make optimal use of display or retail space, as well as to lower the cost of shipment.

SUMMARY OF THE PRESENT INVENTION

The present invention overcomes the above problems of round refuse containers and the inefficient use of space in their storage. The container and a dolly can be attached by conventional fashion; that is, by the engagement of a cylindrical, upwardly extending, dolly boss into a cylindrical threaded socket in the underside of the container. Alignment means is disposed in a top surface of the dolly adapted to engage a registration flange in the underside of the container, whereby, upon rotary connection between the dolly and waste container, the side walls of the dolly and the waste container are brought into side wall co-alignment.

A further element of the present invention is that each of the handles of the square refuse container is provided with a recess formed by downwardly projecting edges. Accordingly, when one container is stacked into another, the upper rim of the underlying container is received within the edge recesses of the upper container's handles, which hold the sidewalls of the underlying container in a fixed position. Resultingly, the container sidewalls are prohibited from flexing outwardly, preventing the bottom container sidewalls from assuming an outwardly biased set. The lid to the container will therefore always fit, even the bottommost container in the vertical stack. Recesses are formed within sidewalls of the container, adapted to receive handles of a like-configured second container. Accordingly, when two containers are positioned in side by side relationship, each container's sidewall recess will receive the handle of the other container, whereby permitting the sidewalls of the containers to be brought into abutment. Consequently, the containers assume a compact storage configuration, making optimum use of storage space.

These and other objectives, which will be apparent to one skilled in the art, are achieved by a preferred embodiment which is described in detail below, and which is illustrated in the accompanying drawings.

DETAILED DESCRIPTION OF THE PREFERRED EMBODIMENT

Figure 1:
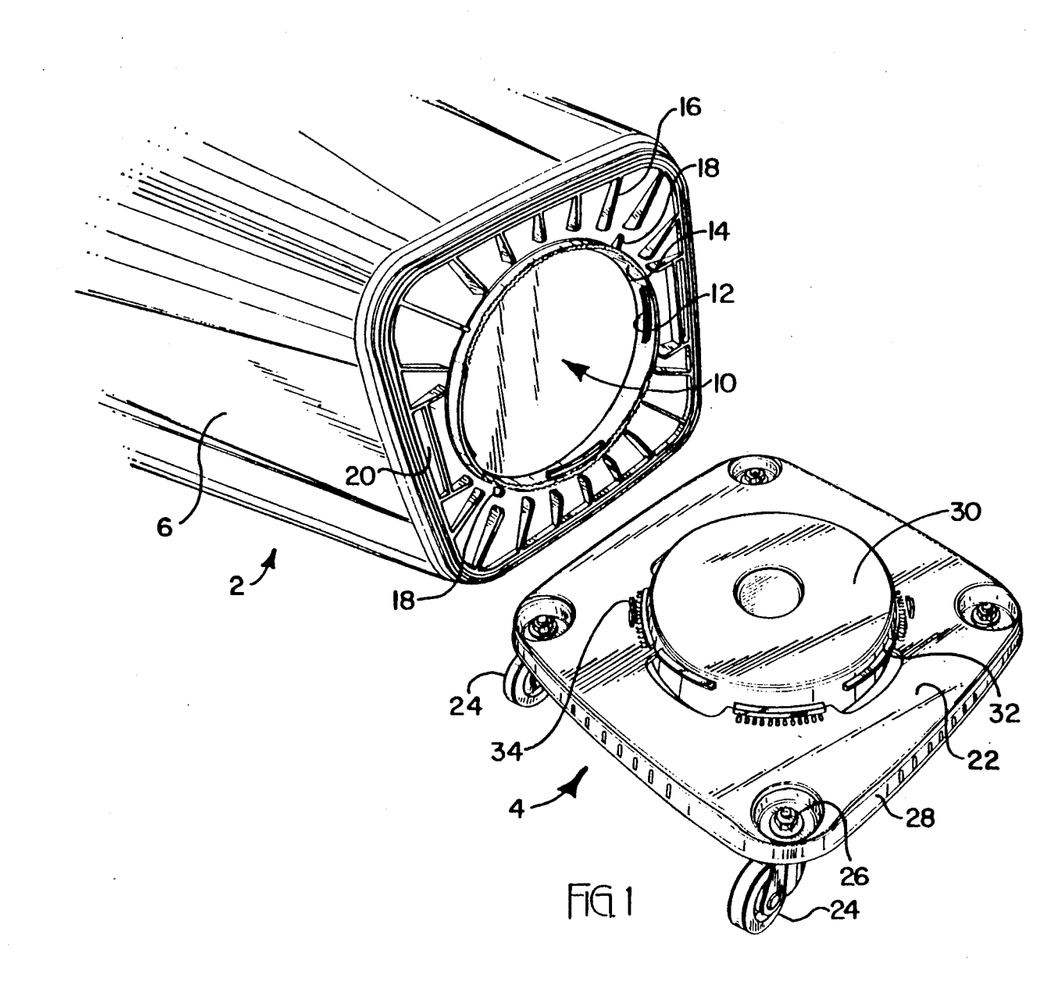
FIG. 1 is a exploded perspective view illustrating the underside of the square waste container and the top of the dolly to which the container is assembled.
Figure 2:
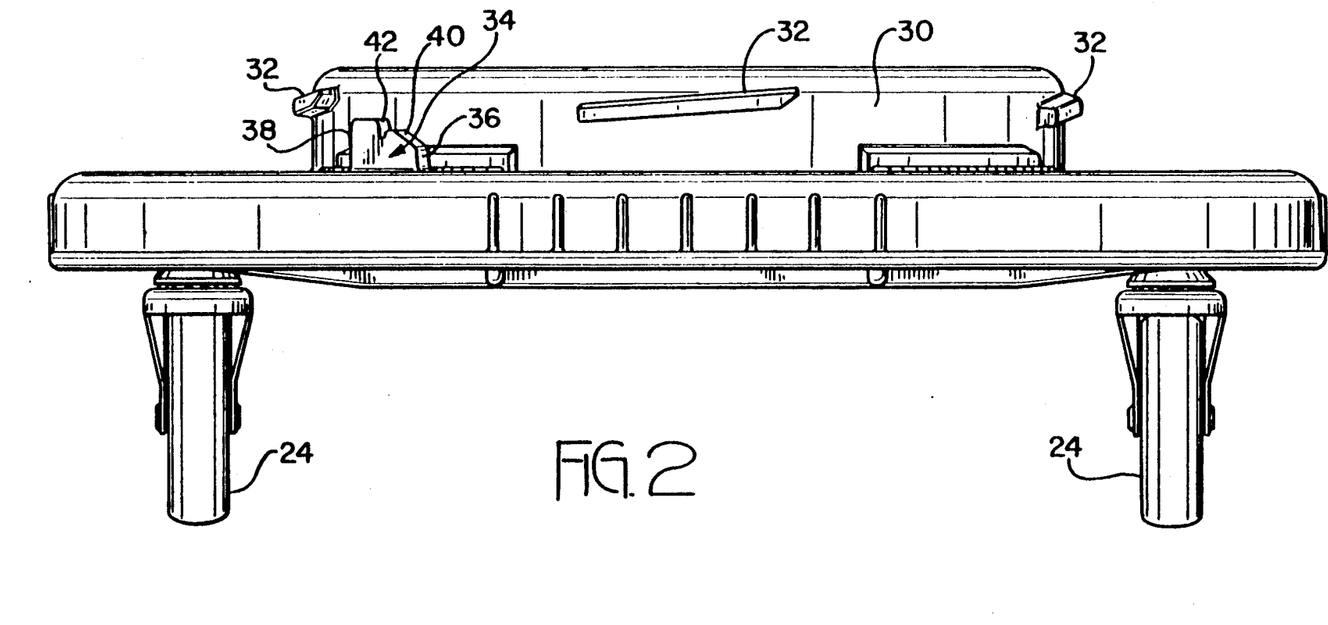
FIG. 2 is a front elevational view of the dolly.
Figure 5:
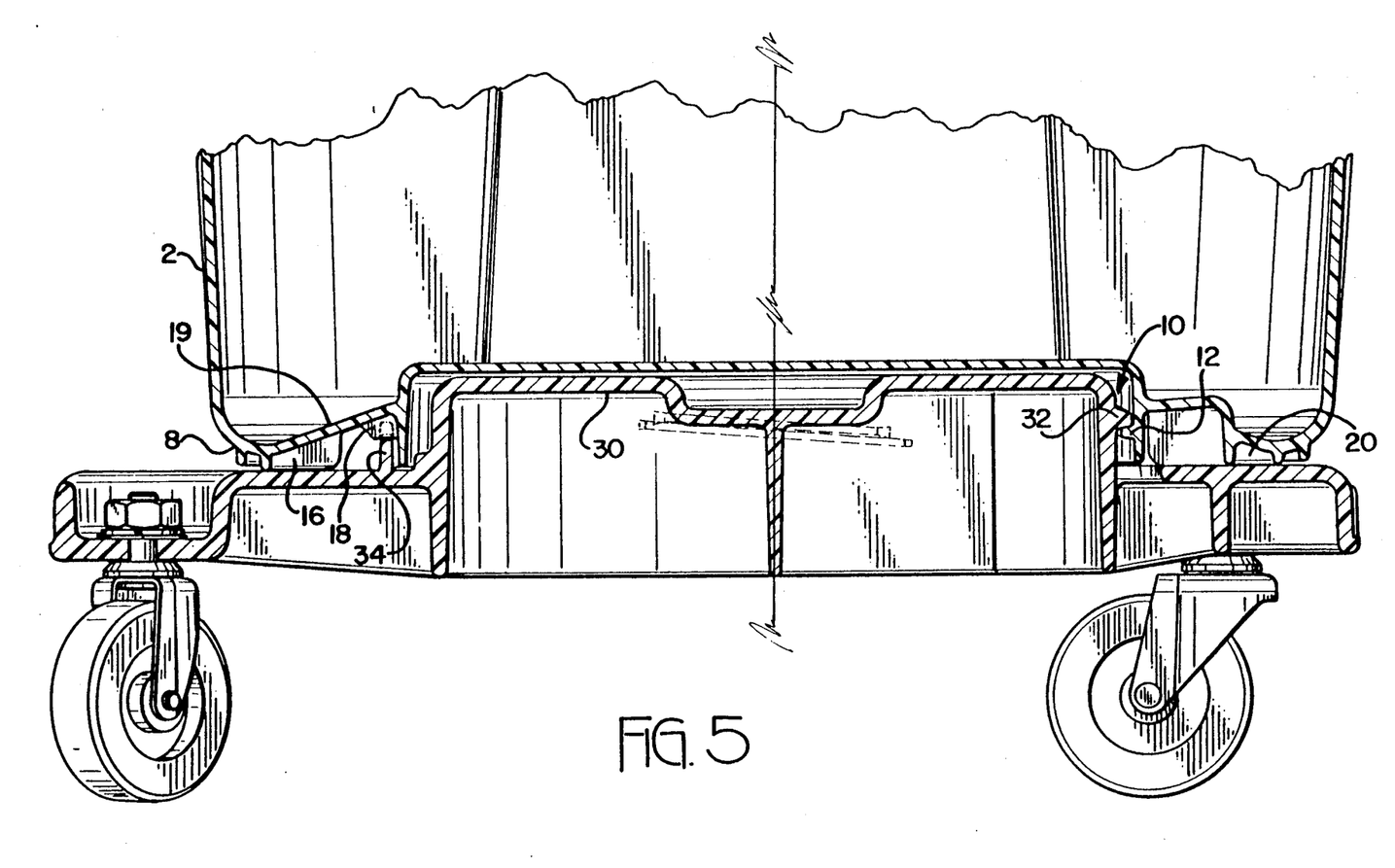
FIG. 5 is an assembled partial transverse sectional view through the container and dolly, taken along the line 5—5 of the dolly depicted in FIG. 4.

With initial reference to FIGS. 1 and 2, the subject waste container and dolly assembly is shown as comprising a container 2 having a square transverse sectional profile, and a dolly 4 which is likewise square in footprint. The container 2 comprises vertical sidewalls 6 and a bottom surface 8. A centrally disposed cylindrical socket 10 extends into the bottom surface 8 as shown in FIG. 5. The socket 10 is provided with internal screw threads 12 integrally formed from socket side walls 14. It will be noted that the socket side walls 14 have a top edge which is generally co-planar with the bottom surface 8 of container 2.

Figure 3:
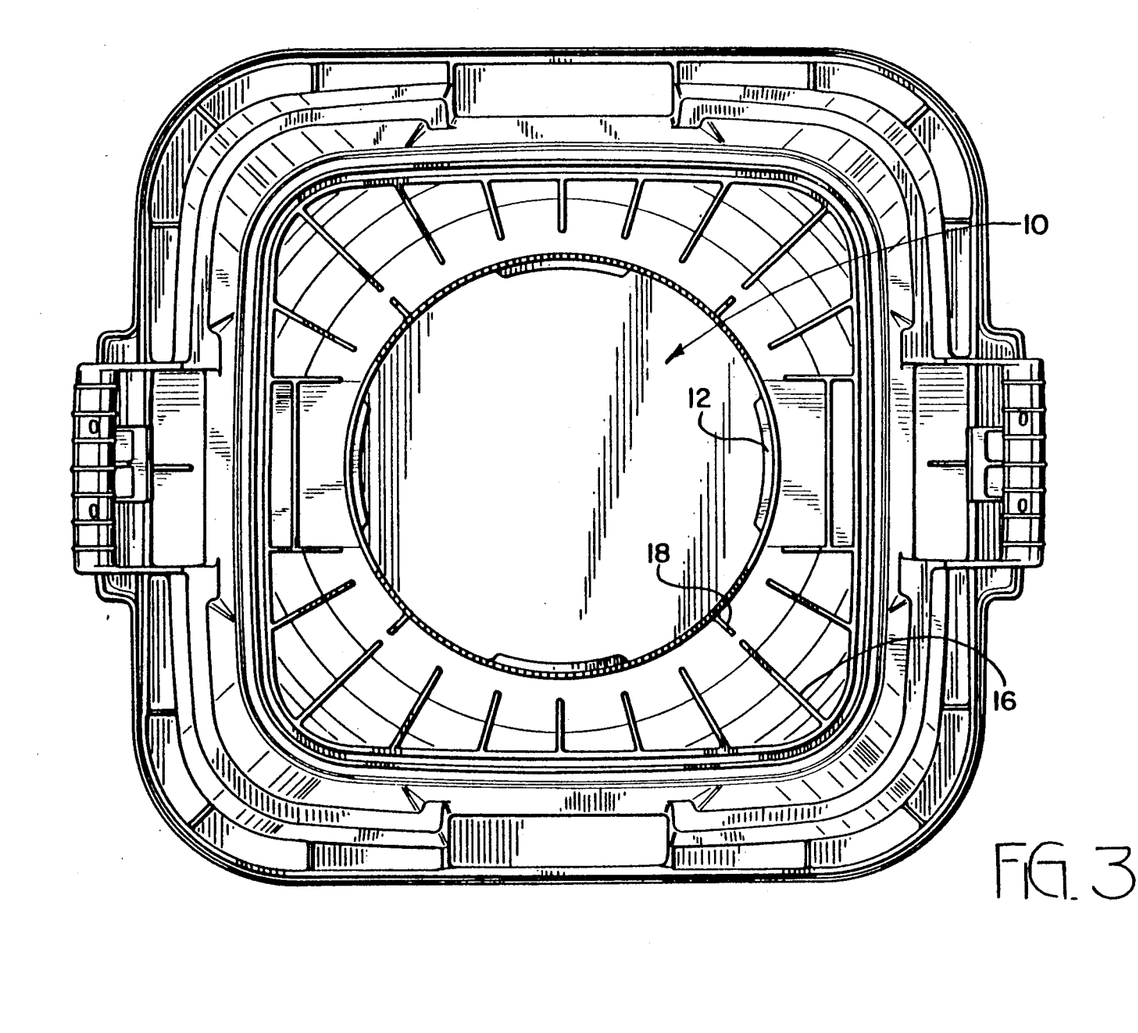
FIG. 3 is a bottom plan view of the container shown in FIG. 1.
Figure 4:
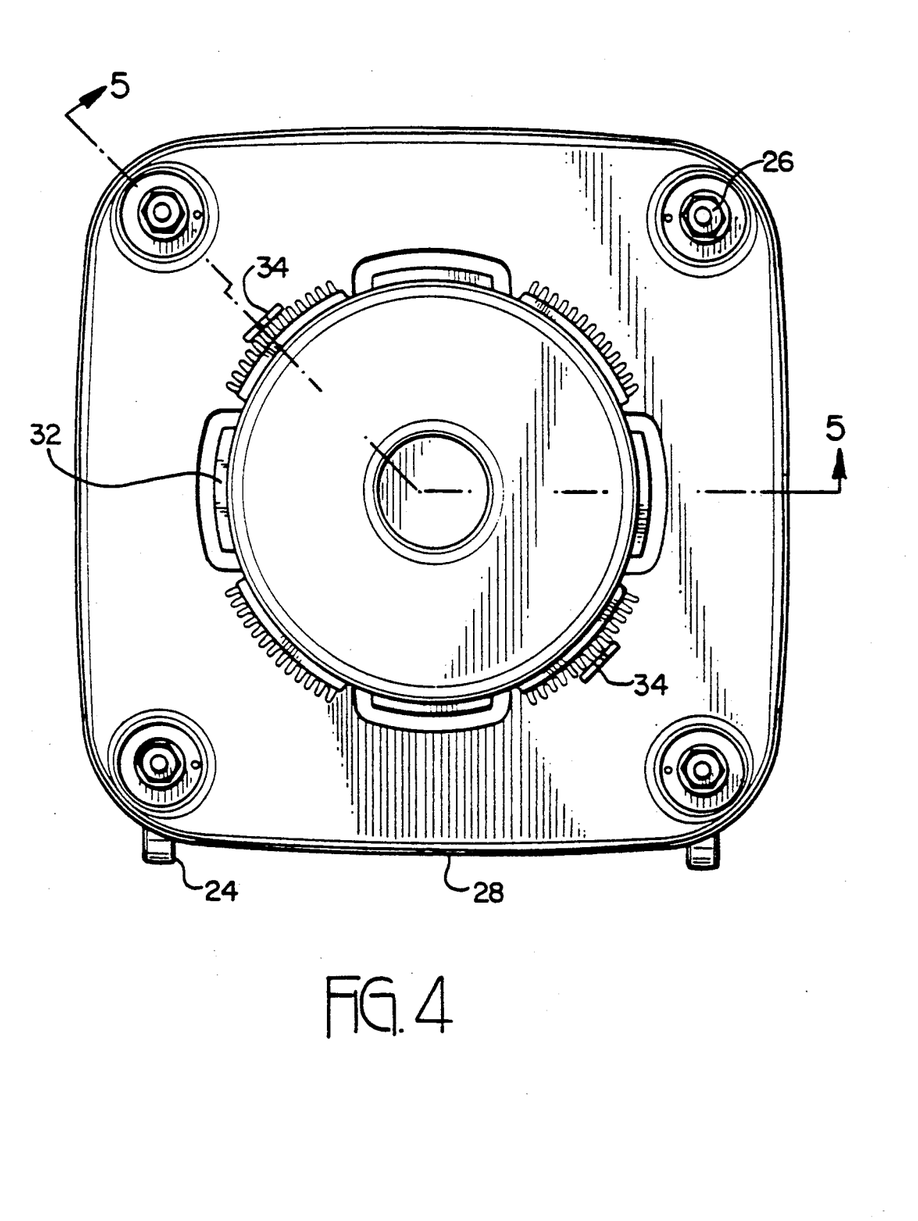
FIG. 4 is a top plan view of the dolly.

Continuing, the structural ribs 16 extend radially inward toward the center socket 10 from the sides 6 of the container 2 toward the sidewalls 14 of socket 10. A radially extending registration rib 18 is provided at each corner of the container 2, extending in the same direction as structural ribs 16.

As best appreciated from FIG. 5, each structural rib 16 has a bottom surface which is co-planar with the bottom surface 8 of container 2. The bottom surface 8 tapers upwardly as shown at 19 in FIG. 5 toward the side walls 14 of socket 10. Consequently, ribs 16 are of increasing depth from the bottom edge of container surface 8 to side walls 14. The registration ribs 18 of the container 2 are located adjacent to the cylindrical side walls 14 of socket 10, with the height of each rib 18 being approximately one-third the maximum height of ribs 16. The reduced height of rib 18 creates a clearance between the bottom most edge of rib 18 and the bottom surfaces of ribs 16.

Reverting back to FIGS. 1 and 2, the bottom of container 2 is provided with a pair of opposing hand grip recesses 20 of rectangular configuration, identifying a hand hold by which the user can grasp the container from the bottom.

A dolly component 4, having a square footprint, is defined by a top surface 22 and is mobile by means of casters 24 assembled to each corner. Each caster 24 is affixed through a corner at the dolly 4, and is retained there by a washer and nut combination 26, countersunk below the top surface 22. The sides 28 of dolly 4 are rounded at the corners as shown in FIG. 1.

Continuing, a cylindrical boss 30 extends upwardly from the top surface 22 of the dolly 4, and is provided with external screw threads 32. A pair of vertical flanges 34 are formed in top 22, generally adjacent to the cylindrical boss 30 and at opposite corners of the dolly 4. The vertical flanges 34, as shown in FIG. 2, are defined by a forward vertical wall 36, a rearward vertical wall 38, and an inclined top surface 40 which extends upwardly from the forward wall 36 to the rearward wall 38. The angle of inclination of top surface 40 is approximately 45 degrees. Situated two-thirds up the inclined top surface 40, and extending downwardly therein, is a transverse groove 42. The purpose of groove 42 will be explained below.

Assembly of the dolly to the container proceeds as follows. As will be appreciated from FIGS. 1 and 5, the dolly is attached by screw thread into the socket 10 of the container 2. The dolly cylindrical boss 30 is inserted into the socket 10, and rotational movement of the dolly relative to the container initiates the screw threaded attachment. As the dolly is rotated, the registration ribs 18 encounter the inclined surface 40 of the dolly vertical flange 34, and ride upward over said surface until entering into the transverse groove 42. At such a point, rotational movement between the dolly and the container is terminated, and the dolly is rigidly affixed to the underside of the container by screw threaded attachment.

It will be appreciated from FIG. 1 that by locating the vertical flange 34 of the dolly 4 at corner locations in the dolly top surface 22, and corresponding location of the registration ribs 18 of the container 2 at corners of the waste container underside surface, rotational movement between the dolly and the container will terminate when the side walls 28 of the dolly are in co-planar and square alignment with the side walls 6 of the container. The direction of the incline of flange 40 coincides with the direction of rotation between the dolly and container. Registration between the ribs 18 and the vertical flanges 34 can be readily overcome by a reverse rotation of the dolly, whereby facilitating disconnection of the dolly from the container.

It will be appreciated that the dolly and the waste container can be molded of conventional plastics material, and that the vertical flanges 34 of the dolly and the registration ribs 18 of the container can be integrally molded therewith. Thus, co-alignment of the dolly and container is accomplished without the need for additional hardware. As will be appreciated, in the assembled condition, the dolly and container side walls are square, and the dolly lies entirely within the footprint of the container underside. The dolly and container assembly can therefore be stored against a wall, or in a corner.

Figure 6:
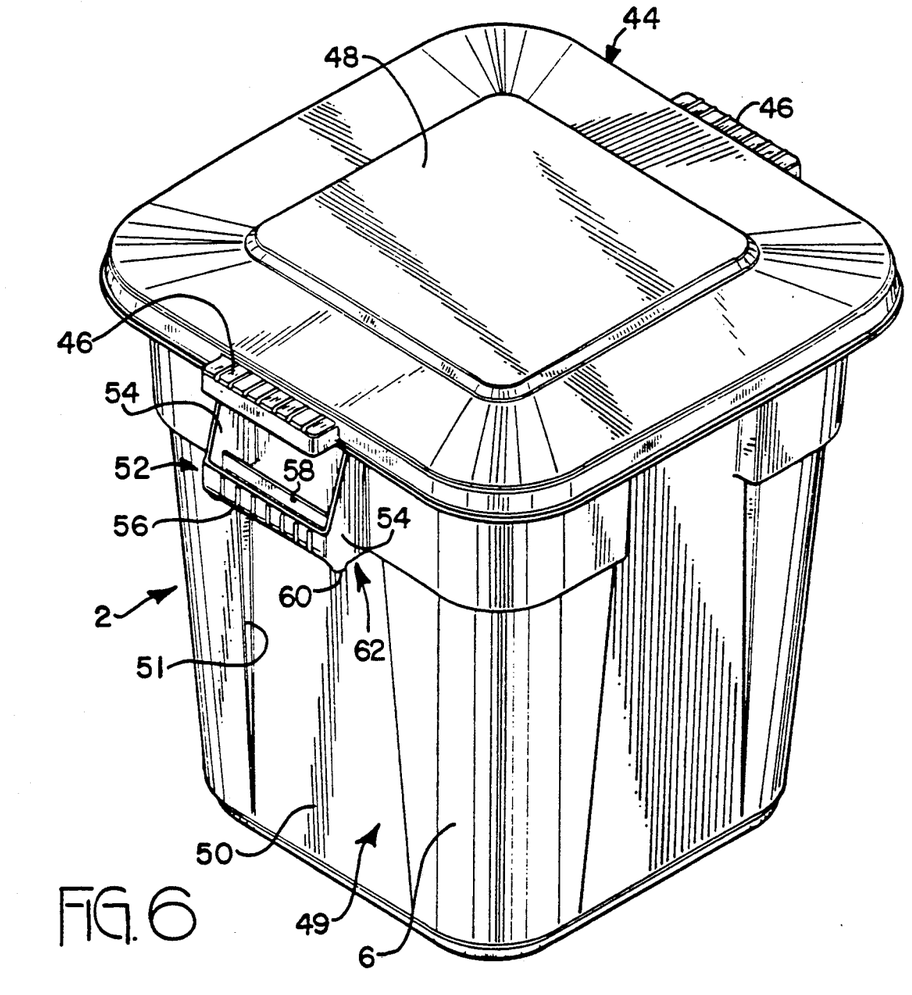
FIG. 6 is a perspective view of the container and lid in the assembled condition.

Referring to FIG. 6, it will be appreciated that a square lid 44 fits downward over container 2 and snaps over the upper rim thereof in conventional fashion. Two outwardly projecting lid handles 46 extend from the body of lid 44. At the midportion of the top lid surface is an upraised platform 48.

In each of the four sidewalls of container 2 is provided a vertical recess 49, which flares outwardly from the top rim surface of the container downward to a bottom surface of the container. The width dimension of the recesses 49 are specified in accordance with the following.

Each of the recesses 49 is provide with a recess floor 50, and recess sidewalls 51. A pair of outwardly projecting handle members 52 are provided to extend outwardly from opposite sides of the container 2. Each handle consists of spaced apart outwardly projecting sideplates 54, having remote ends connected by a horizontal handle grip 56. The handle grip 56 is configured having a U-shaped transverse section, which defines a grip channel 58. Sideplates 54 are preferably perpendicular to the sidewall from which they project while grip 56 runs parallel to said sidewall.

Figure 7:
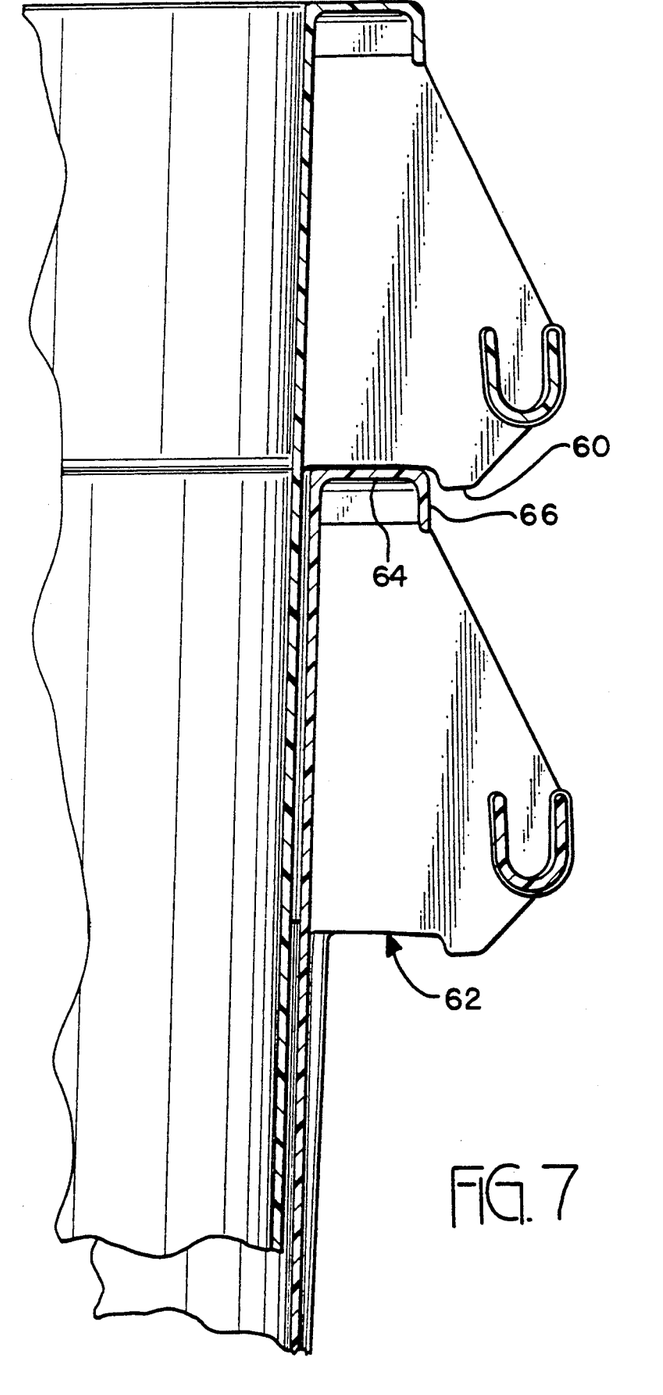
FIG. 7 is a vertical section view through two stacked containers showing the nesting of the rim of the underlying container within the grooved undersurface of the uppermost container's handle.

With continued reference to FIGS. 6 and 7, each handle sideplate 54 is provided with a downward protrusion 60 at a remote end, which, in combination with the container sidewall, defines a downwardly concave handle recess 62. The container rim 64 is downturned, and is sized to correspond with the width dimension of handle recesses 62, such that when one container is stacked within another, as depicted in FIG. 7, the upper rim flange 64 of the bottom container is received in nesting fashion within the handle recess 62 of the handle sideplates 54.

It will be appreciated from FIG. 6 that both sideplates 54 of each handle member 52 have a handle recess 62 formed therein. Accordingly, when stacked into an underlying container, the upper rim of the underlying container is received into four recesses, namely the two sideplate recesses 62 of the two handles. As will be appreciated from FIG. 7, in the stacked condition, the sidewalls of the underlying container are held in a vertical orientation, restrained by the handle recess 62 of the top container. Held in a fixed vertical condition, sidewalls of the underlying container cannot flex outwardly and assume an outwardly biased set. Accordingly, when the containers are disengaged, the square lid 44 shown in FIG. 1 will fit as intended over each container in a vertical stack, even the bottommost container.

Figure 8:
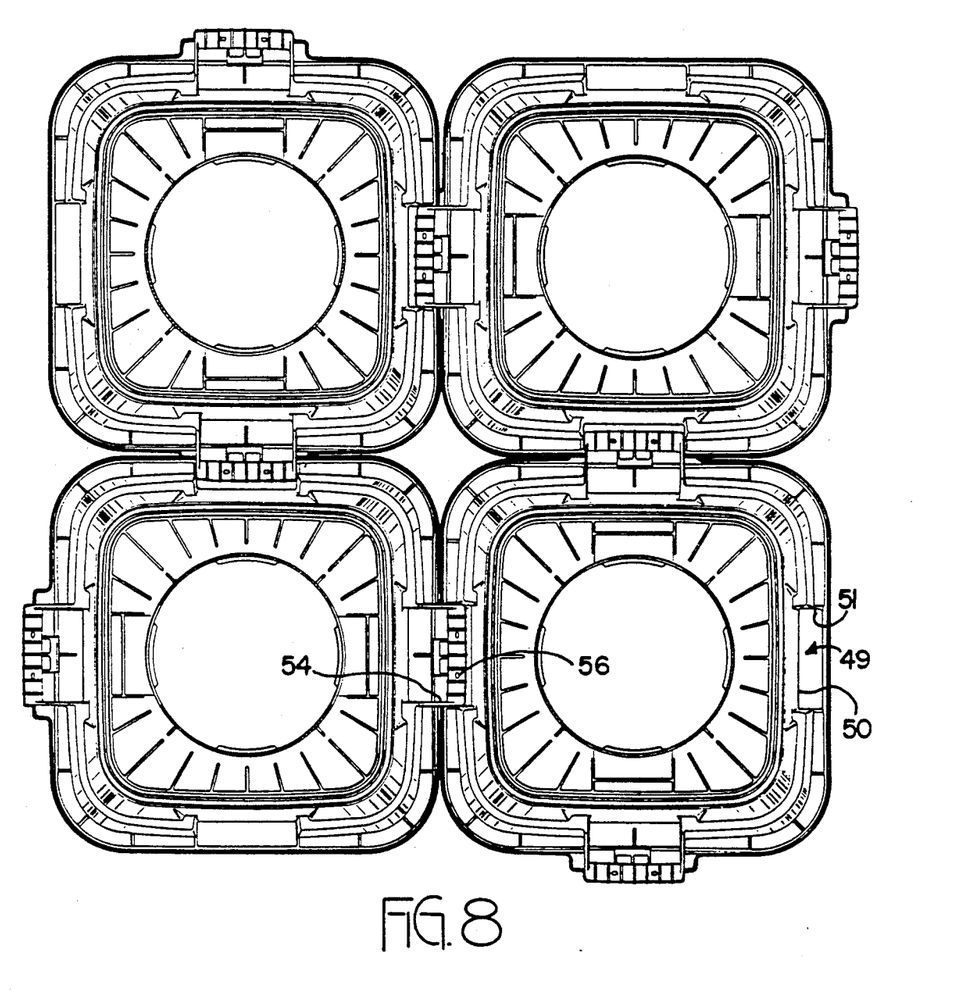
FIG. 8 is a bottom plane view of four refuse containers in side by side abutment, showing the receipt of the handles of each container into the recesses formed within the sidewalls of the next adjacent container.

Referring next to FIGS. 6 and 8, it will be appreciated that the sidewall recesses 49 are of a width substantially corresponding to the width of the handles 52. When two containers are brought into side by side abutment, the handle 52 of one container can fit within the recess 49 of the adjacent container, whereby the containers can be arrayed as shown. Accordingly, the storage space necessary to contain the containers is minimized. Furthermore, as shown in FIG. 8, four containers or more can be correspondingly configured to engage adjacent containers, since a sidewall recess 49 is present in all four of the container sidewalls. When each container is brought into abutment against two other containers, the mutually interlocked handles and recesses create a stable container array.

From the foregoing, it will be apparent that the dolly affixed to the undersurface of the refuse container lies within the footprint of the container bottom. That is, the dolly does not protrude outward beyond the sides of the container bottom. Accordingly, with the dolly affixed to the container, the containers are interlockable pursuant to the handle-in-recess structure recited above, and as illustrated in FIGS. 6–8. Storage of the containers can therefore be with the dollies attached.

While the aforementioned describes the preferred embodiment of the subject invention, the invention is not to be so restricted. Other embodiments, which will be apparent to one skilled in the art, and which utilizes the teachings hereinsetforth, are intended to be within the scope and spirit of the present invention.

We claim:

1. A quadrilateral first container comprising a bottom and four sidewalls extending upwardly therefrom and terminating at an upper rim; and said container further comprising a handle extending outward from at least one side of the container, the handle having two parallel spaced-apart sideplates connected at an inward end to said container one side, and a handle gripping segment connecting outward ends of said sideplates;

said container further comprising a recess formed within a second widewall, and having a position and configuration for receiving a handle of a second container when said first and second containers are placed in adjacent relationship, whereby sides of said first and second containers are in close opposing abutment.

2. A first container according to claim 1, said recess extending from said container upper rim toward said bottom, and having a width sufficient to closely receive one said container handle therein.

3. A first container according to claim 2, said container recess having a decreasing depth from said container upper rim toward said bottom, and having a width substantially equal to said handle gripping portion.

4. A first container according to claim 3, said container further comprising a quadrilateral dolly, said dolly and said container bottom having mutually engaging means for rotatably attaching said dolly to said container bottom, and positioning sidewalls of said dolly in substantial coplanar alignment with sidewalls of said container.

5. A quadrilateral container comprising a bottom and four sidewalls extending upwardly therefrom and terminating at an upper rim; and first and second oppositely facing sidewalls having a handle extending outwardly therefrom, each said handle comprising two spaced apart sideplates, each said sideplate having a first end affixed to a respective sidewall and a remote end extending perpendicularly outward therefrom, said handle further comprising a crossbar having ends affixed to said sideplate remote ends;

said container further having in third and fourth opposite sidewalls a handle-receiving recess formed therein, said handle-receiving recess being dimensioned and located to receive a handle of a second like-configured container whereby positioning said container and said second container in a side-by-side abutting relationship.

6. A container according to claim 5, said handle-receiving recess extending from said container upper rim toward said bottom, and having a width substantially equal to said spacing between said handle sideplates.

7. A container according to claim 6, further comprising a quadrilateral dolly, said dolly and said container bottom having mutually engaging means for rotatably attaching said dolly to said container bottom, and positioning said sidewalls of said dolly and said container in substantial coplanar alignment.

8. A quadrilateral first container for refuse, comprising a bottom and four sidewalls extending upwardly therefrom and terminating at an upper rim, said container having a handle extending outward from at least one said sidewall and having profiled recess means in at least two other sidewalls, each adapted to receive a handle of a like-configured second container, whereby three of said like-configured containers being simultaneously positionable in a side by side interlocking relationship;

said recess means having a width dimension substantially equivalent to the width of said container handle, and said recess means extending from said upper rim toward said bottom.

9. A first container according to claim 8, further comprising a rotatably affixed dolly attached to said container bottom and lying within lower edges of said sidewalls of said bottom, whereby said container being positionable in said interlocking relationship with said second container with one said dolly affixed to each said container bottom.

10. A first container according to claim 9, said dolly having four sides, and said container bottom having registration means for engaging said dolly as said dolly is rotatedly attached thereto, and terminating said rotation when sides of said dolly and said container are in coplanar respective alignment.

11. A quadrilateral container comprising a bottom, four sidewalls extending upwardly from said bottom and terminating at an upper rim, a peripheral upper portion extending from said upper rim downward along each of said sidewalls, a recess within said upper portion of first and second oppositely facing sidewalls, a handle extending outwardly from third and fourth oppositely facing sidewalls at a location corresponding to the location of said recess in said upper portions of said first and second sidewalls and wherein each recess within said upper portion of the other two oppositely facing sidewalls have a position and configuration for receiving a handle of a like-configured container, whereby sides of the container and the like-configured container can be in close opposing abutment.

12. A container according to claim 11, wherein said handle comprises two parallel, spaced-apart sideplates connected at first ends to said sidewall upper portion and a horizontal gripping segment connected at opposed ends thereof to second ends of said sideplates.

13. A container according to claim 12, wherein each said recess within said upper portion has a width dimension substantially equivalent to the width dimension of the handle.

14. A container according to claim 13, wherein said handle gripping segment of each said first and second sidewalls is spaced outwardly from said sidewalls by said sideplates.

15. A container according to claim 11, wherein each said recess flares outwardly from a position within said upper portion and continues downward along said sidewall, being of decreasing depth from top to bottom.

16. A container according to claim 11, wherein said upper rim is supported by a plurality of support ribs extending perpendicular from said sidewalls and said upper rim.

17. A container according to claim 11, wherein an underside of said bottom includes a recessed, centrally disposed cylindrical socket; a plurality of radially extending first ribs extending inwardly from near an outer edge of said bottom; said bottom being tapered upwardly from said outer edge of said bottom to said cylindrical socket; and a pair of second ribs generally perpendicular to and extending inwardly from said outer edge of said bottom to define a region between said socket and said outer edge.

* * * * *